G. CLAUDE.
METHOD OF EXTRACTING RARE GASES FROM THE AIR.
APPLICATION FILED SEPT. 22, 1909.

1,025,962.

Patented May 14, 1912.

WITNESSES:

INVENTOR
Georges Claude
BY
ATTORNEY

UNITED STATES PATENT OFFICE.

GEORGES CLAUDE, OF PARIS, FRANCE, ASSIGNOR TO SOCIÉTÉ L'AIR LIQUIDE, SOCIÉTÉ ANONYME POUR L'ETUDE ET L'EXPLOITATION DES PROCÉDÉS GEORGES CLAUDE, OF PARIS, FRANCE.

METHOD OF EXTRACTING RARE GASES FROM THE AIR.

1,025,962.   Specification of Letters Patent.   Patented May 14, 1912.

Application filed September 22, 1909. Serial No. 519,065.

*To all whom it may concern:*

Be it known that I, GEORGES CLAUDE, a citizen of the Republic of France, and resident of Paris, France, have invented a new and useful Method for Extracting Rare Gases from the Air, which improvement is fully set forth in the following specification.

This invention relates to the separation of rare gases from the atmosphere, and has particular reference to a process for the separation of the rarer and less condensable gases as neon and helium, from the atmosphere.

The invention involves for that purpose the application of processes well known for the liquefaction and separation of the oxygen and nitrogen contained in the air, and consists in so modifying the procedure as to enable the remaining uneasily condensable gases existing in the air under treatment to be isolated.

According to this invention the air under pressure containing the rare gases to be separated is subjected to a process whereby the greater part of the oxygen and of the nitrogen are liquefied, and the remaining unliquefied gas or gases are then submitted to a single or repeated process of liquefaction with backward return, the principles underlying which have been disclosed in the specification of my prior U. S. Patent, No. 924,428. These processes of liquefaction may be effected by bringing the unliquefied gases, while still under pressure, into indirect contact with cold agents and finally with the liquid nitrogen or liquid rich in nitrogen obtained as above. Said nitrogen, being very cold, permits only the uncondensable rare gases, chiefly neon and helium, to preserve their gaseous state. The process whereby the oxygen and nitrogen of the air are in the first place liquefied is preferably one involving also liquefaction, with backward return, as above stated.

In order that the invention may be clearly understood and readily carried into effect, we will describe the same more fully with reference to the accompanying drawings, in which:—

Figure 1:
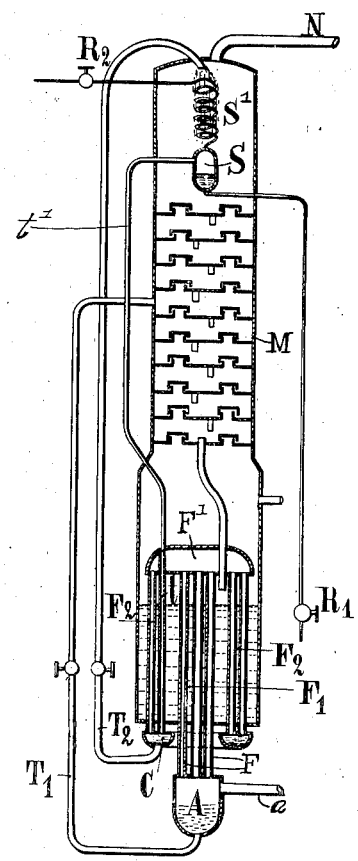
Figure 2:
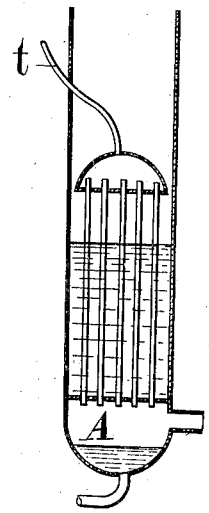

Figure 1 represents diagrammatically and by way of example one arrangement of apparatus for carrying out the process in accordance with the present invention, and Fig. 2 represents a modification of part of the apparatus.

Referring first to Fig. 1, the lower part of the apparatus is similar to that disclosed in the specification of our prior U. S. Patent No. 881,176, and consists of a nest of tubes F, leading upward into a chamber F', and a nest of tubes F² leading downwardly away therefrom, these tubes and the chamber being immersed in the liquid oxygen or liquid rich in oxygen that collects or is held at the foot of rectifying column M.

The air to be treated is suitably compressed and cooled, and then conducted through the inlet $a$ into the chamber A, whence it passes up the nest of tubes F. On the principle of liquefaction with backward return, the oxygen of the air and a part of the nitrogen becomes liquefied in the tubes F, flows downwardly into the chamber A where it collects and then passes upwardly through the pipe T' into the rectifying column M at a suitable point. The unliquefied part of the air passes into the chamber F' and thence passes down the nest of tubes F². In these tubes F² most of the nitrogen and any remaining gaseous oxygen are liquefied and are collected in the chamber C, whence they are conveyed by the pipe T² to the top of the rectifying column M. The rectifying action of this column results, as is known, in practically pure oxygen collecting at the foot of the column and practically pure gaseous nitrogen escaping through the pipe N at the top of the column.

The gaseous residues remaining from the liquefaction of the oxygen and most of the nitrogen in the tubes F and F² respectively, pass, still under pressure, up the tube $t$, in which any further liquefaction that takes place does so on the same backward return principle. The gaseous residue escaping from the tube $t$ and passing along the pipe $t'$ is very difficult to liquefy, but the temperature may not have been sufficiently low to remove from the gaseous residue all traces of gases other than the rare gases, neon and helium, since the temperature of the tube $t$ is only about that of liquid oxygen. In order to effect a still further cooling, and thereby remove all traces of gases other than neon or helium, the gaseous residue still under pressure escaping by the pipe $t'$, is brought into indirect contact with the liquid nitrogen, or the liquid rich in nitrogen, resulting from the separation and existing under a lower pressure, and is caused to travel in such a way that any liquefied portion of the gaseous residue flows backward into contact with the oncoming gaseous portions. Under the simultaneous influence of the pressure of the gases and the exceedingly low temperature of the evaporating liquid nitrogen or liquid rich in nitrogen, all portions of the gaseous residue, except the uncondensable rare gases, will be liquefied, and the whole of the rare gases, consisting mostly of neon and helium, will thus be isolated in the gaseous state.

In order to bring the gaseous residues into contact with the liquid nitrogen as above described, they may conveniently be passed through a chamber S and along an upwardly extending spiral S' over which the liquid nitrogen that passes up the pipe $T^2$ is poured, as shown in Fig. 1. The liquefied portion of the residue will collect in the chamber S and may be withdrawn through a pipe provided with a tap R', and the unliquefied portion, which will consist of or will be very rich in neon and helium, will be ready to pass on through a pipe having an appropriate tap $R^2$.

The hereindescribed process is applicable to cases in which the air is subjected to liquefaction in a single stage, instead of in two stages as described with reference to Fig. 1. For example, the lower part of apparatus shown in Fig. 1 might be replaced, by that shown in Fig. 2, in which it will be seen that the oxygen and most of the nitrogen of the air are liquefied in a single stage, and the gaseous residue escapes through the pipe $t'$, as before. In this case, the liquid air collected in the chamber A would be separated in any known manner into liquid oxygen and liquid nitrogen and the liquid nitrogen would then be used as hereinbefore described for the further purpose of cooling of the gaseous residue.

What is claimed is:—

1. A process for separating rare gases from the atmosphere which consists in bringing cold compressed air into indirect contact with liquid oxygen or liquid rich in oxygen, thus liquefying the greater part of the oxygen and of the nitrogen of the air and causing the gaseous residue of this liquefaction to partially liquefy by circulating it in indirect contact with liquids rich in nitrogen and in oxygen.

2. A process for separating rare gases from the atmosphere which consists in bringing cold compressed air into indirect contact with liquid oxygen or liquid rich in oxygen, thus liquefying the greater part of the oxygen and of the nitrogen of the air, using the liquid oxygen and nitrogen obtained for partially liquefying by indirect contact the gaseous residue of said liquefaction and causing the liquefied portions of this residue to travel in the opposite direction to and in direct contact with further quantities of the residue to be partially liquefied.

3. A process for separating rare gases from the atmosphere which consists in bringing cold compressed air into indirect contact with liquid oxygen or liquid rich in oxygen, thus liquefying the greater part of the oxygen and of the nitrogen of the air, using the liquid oxygen and nitrogen obtained for partially liquefying by indirect contact the gaseous residue of said liquefaction under the same pressure and at lower temperature than the aforesaid liquefaction takes place.

4. A process for separating rare gases from the atmosphere which consists in bringing cold compressed air into indirect contact with liquid oxygen or liquid rich in oxygen, thus liquefying first the greater part of the oxygen of the air with some of the nitrogen by causing the liquefied portions to travel in the opposite direction to and in direct contact with further quantities of the air to be liquefied, then liquefying the greater part of the nitrogen, finally causing the gaseous residue of these liquefactions to partially liquefy by circulating it in indirect contact with liquids rich in nitrogen and in oxygen.

5. A process for separating rare gases from the atmosphere which consists in bringing cold compressed air into indirect contact with liquid oxygen or liquid rich in oxygen, thus liquefying first the greater part of the oxygen of the air with some of the nitrogen by causing the liquefied portions to travel in the opposite direction to and in direct contact with further quantities of the air to be liquefied, then liquefying the greater part of the nitrogen, using the liquids above obtained for partially liquefying by indirect contact the gaseous residue of the aforesaid liquefactions under the same pressure and at lower temperatures than the aforesaid liquefactions take place.

6. A process for separating from the atmosphere, rare gases, particularly neon and helium or a gaseous mixture rich in same, which consists in bringing cold compressed air into indirect contact with liquid oxygen or liquid rich in oxygen, which is thereby vaporized, thus liquefying the greater part of the oxygen and of the nitrogen of the air, rectifying the resulting liquid by circulating it in direct contact and in opposite direction to the evaporated oxygen or gas rich in oxygen, using the liquids obtained by the liquefaction and rectification for partially liquefying by indirect contact the gaseous residue of the first lique-faction under the same pressure but at lower temperature than this first liquefaction takes place.

7. A process for separating from the atmosphere, rare gases, particularly neon and helium or a gaseous mixture rich in same, which consists in bringing cold compressed air into indirect contact with liquid oxygen or liquid rich in oxygen which is thereby vaporized, thus liquefying the greater part of the oxygen and of the nitrogen of the air, rectifying the resulting liquid by circulating it in direct contact and in opposite direction to the evaporated oxygen or gas rich in oxygen, using the liquids obtained by the liquefaction and rectification for partially liquefying by indirect contact the gaseous residue of the first liquefaction under the same pressure but at lower temperatures than this first liquefaction takes place and causing the liquefied portions of this residue to travel in the opposite direction to and in direct contact with further quantities of the residue to be partially liquefied.

8. A process for separating from the atmosphere rare gases, particularly neon and helium, or a gaseous mixture rich in same, which consists in bringing cold compressed air into indirect contact with liquid oxygen or liquid rich in oxygen which is thereby vaporized, thus liquefying first the greater part of the oxygen of the air with some of the nitrogen by causing the liquefied portions to travel in the opposite direction to and in direct contact with further quantities of the air to be liquefied, then liquefying the greater part of the nitrogen, causing the gaseous residue of the liquefaction to partially liquefy, thereby letting the liquefied portions travel in the opposite direction to and in direct contact with further quantities of the residue to be liquefied, bringing about this liquefaction of the gaseous residue by circulating it in indirect contact with liquids richer and richer in nitrogen which are being rectified and finally with the liquid rich in nitrogen above obtained which is then rectified as well as the liquid rich in oxygen above obtained, by the aforesaid vapors ascending from the liquid oxygen or liquid rich in oxygen.

In testimony whereof I have signed this specification in the presence of two subscribing witnesses.

GEORGES CLAUDE.

Witnesses:
EMILE LEDET,
H. C. COXE.